April 27, 1965   W. J. LONG   3,180,355
PILOT OPERATED RELIEF VALVE WITH AUXILIARY PILOT CONTROL
Filed July 16, 1962
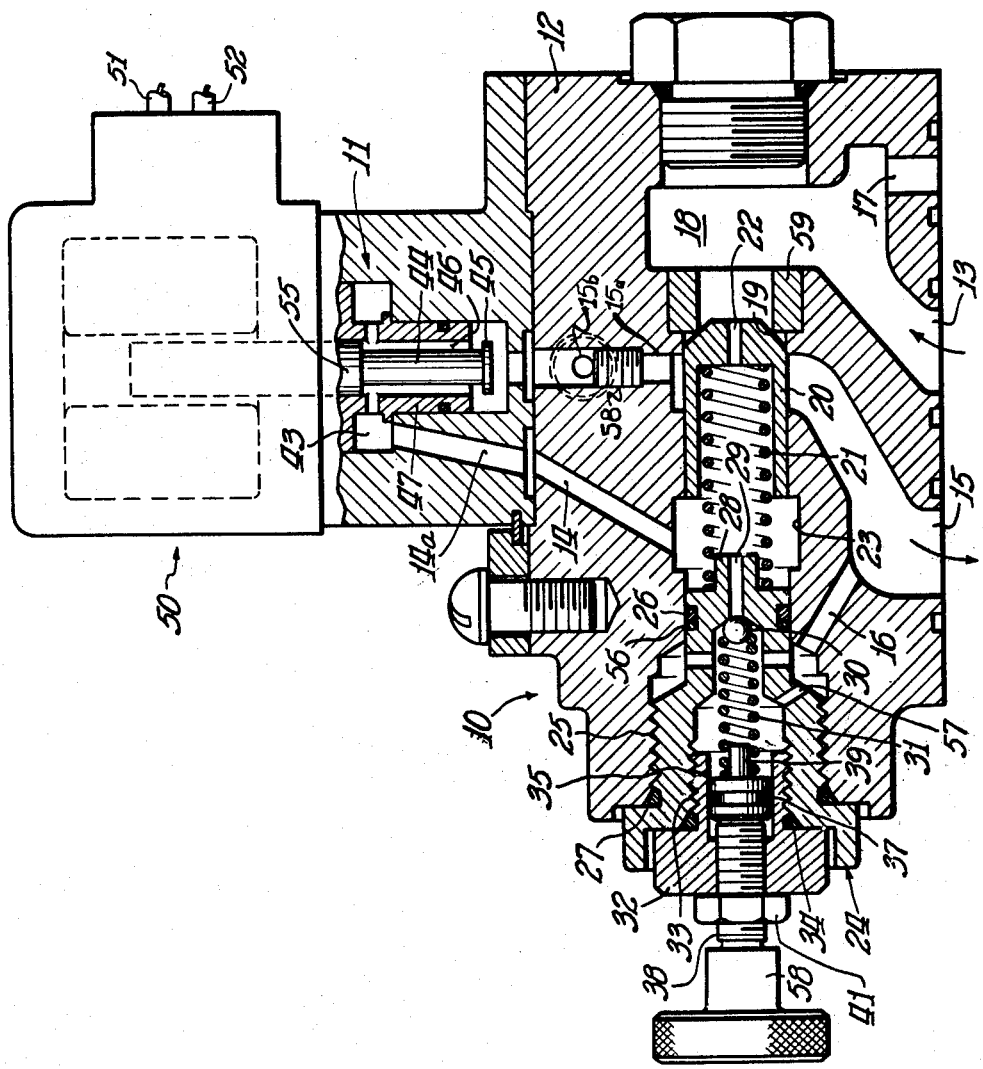
Inventor:
Wayne J. Long United States Patent Office 3,180,355
Patented Apr. 27, 1965

3,180,355
PILOT OPERATED RELIEF VALVE WITH
AUXILIARY PILOT CONTROL
Wayne J. Long, Wooster, Ohio, assignor to Borg-Warner
Corporation, Chicago, Ill., a corporation of Illinois
Filed July 16, 1962, Ser. No. 209,874
1 Claim. (Cl. 137—491)

This invention relates to a fluid pressure control system and more particularly to a pressure control system wherein a specific fluid operating pressure may be maintained and the source pressure and line pressure may be released at a given time or under given conditions by means of condition responsive means.

Prior to this invention, a relief valve served to provide a bypass for fluid when the pressure in the system to which it was connected reached a given predetermined maximum pressure. Also, some valves were designed as relief valves wherein one valve would automatically open to permit a flow of fluid in a system at a predetermined pressure generated by a pump when signaled by a separate auxiliary valve.

The present invention is directed to a fluid pressure control system wherein a main valve is operated in combination with an auxiliary valve as an integral assembly. The main valve operates so as to allow circulation of fluid in a primary circuit at an optimum operating range of pressure and provides for the return of fluid to a sump. If a maximum pressure is exceeded, the main valve also operates as a relief valve.

The auxiliary valve operates in combination with the main valve to release source pressure and line pressure at a given time or under given predetermined conditions of pressure. The auxiliary valve is preferably actuated by a solenoid. If a solenoid is utilized, it is energized by means of condition responsive indicator-actuator means appropriately situated in the system to sense given predetermined conditions.

One embodiment of the invention is hereinafter illustrated to set forth the best mode contemplated to carry out this invention. It is to be understood, however, that the invention may be produced in other modified forms that come within the scope of the appended claim. Reference will be made to the drawing, in which:

The sole figure is a cross-sectional view of the main valve and auxiliary valve as they are situated so as to operate in combination with each other.

Like characters of reference indicate corresponding parts throughout the following description of the fluid pressure control system. The fluid pressure control system is comprised of a main valve assembly, indicated generally as 10, and an auxiliary valve assembly operating in combination therewith, indicated generally as 11.

The main valve 10 is comprised of a first and second valve assembly mounted within a housing 12 having an inlet port 13, venting port 14, a return port 15, and a high pressure venting port 16. A gage port 17 is provided so as to communicate with the inlet port 13 and is connected to a pressure gage (not shown). Inlet port 13 is connected to a first chamber 18 surrounded by a sleeve 59 having an annular valve seat 19 on the left end thereof. Mounted in housing 12 in axial alignment with valve seat 19 is a piston valve 20, with a helical spring 21 extending so as to contact the inner periphery thereof. Spring 21 is adapted to urge piston 20 into seating engagement with valve seat 19. The forward right end of piston 20, i.e., that portion of piston 20 that seats in valve seat 19, is provided with an axial passage 22 which connects first chamber 18 with a second chamber 23 situated to the rear or left of valve piston 20. Chamber 23 is in communication with outlet port 14 which connects with auxiliary valve 11.

Sleeve 59, piston 20, spring 21, and valve seat 19 above mentioned will be hereinafter referred to as the second valve assembly of main valve 10.

Immediately to the rear, i.e. to the left of spring 21, is a relief valve cartridge 24 which is mounted in the housing 12 of the main valve assembly 10. Cartridge 24 is held in position by threads 25 and sealed against fluid leakage by a sealing ring 26 and back-up ring 56 on the forward portion thereof, i.e. on the right end, and a sealing ring 27 on the rearward portion thereof. The forward end of cartridge 24 protrudes to form a nose portion 28, around which spring 21 of the second valve assembly is seated to axially align spring 21 with cartridge 24 and piston valve 20. The rearward portion of cartridge 24 is of larger diameter than the forward portion and has a cap screw 32 mounted therein by means of threads 33. Cap screw 32 is sealed against leakage by a sealing ring 34. The forward portion of cartridge 24, including nose 28, is provided with an axial passage 29 which is closed by a poppet 30 which seats at the left of passage 29 and is held in sealing engagement with passage 29 by a spring 31. The cartridge 24 contains a bleed holde 57 therein to allow fluid to drain from cartridge 24 into passage 16 when poppet 30 is unseated in liquid cartridge 24. The rear or left end portion of spring 31 is mounted around a pin 39 situated on a plug assembly 35. The plug assembly 35 has a peripheral groove thereon within which a sealing ring 37 is situated. Assembly 35 is moved forwardly, i.e. to the right, and rearwardly, i.e. to the left, to adjust the tension on spring 31 by turning an adjusting screw 38 Adjusting screw 38 is retained in place by a jam nut 41 and is limited in forward movement by mechanical stop 58. Cartridge 24, spring 31, and poppet 30 will be hereinafter referred to as the first valve assembly of main valve 10.

Auxiliary valve 11 is connected with main valve 10 by a passage 14a extending from outlet port 14 in housing 12 of main valve 10 and also by an extension passage 15a of venting port 15 of main valve 10. Passage 14a is connected to a chamber 43 of valve 11. Valve 11 is operated by a solenoid, generally indicated as 50. Solenoid operated auxiliary valve 11 is comprised of a valve plunger stem 44 having a land 45 thereon which seals in bore 46 situated in valve sleeve 47. Valve stem 45 is moved axially with respect to bore 46 when the solenoid 50 is energized. Energizing solenoid 50 exerts a pulling force on plunger 44, i.e. an upward force, and causes land 45 to seal in bore 46. Solenoid 50 will not be described in detail, but is the conventional solenoid apparatus comprised of an armature 55 actuated by an electrical charge passing through electric lines 51 and 52.

A port 15b is situated between the second valve assembly of main valve 10 and auxiliary valve 11 and receives that fluid which passes through auxiliary valve 11 and serves as a conduit to circulate fluid through a secondary system with plug 58 in place. When the secondary circuit is not required plug 58 is removed and the fluid passes through port 15a and port 15 to sump.

The fluid pressure control system of this invention is especially adapted to control the pressure of fluid when it is circulated in a system, for example, to operate machine tools, cycling devices, etc. This invention provides means whereby the pressure in a system is closely controlled during operation yet is capable of being released at a given time or under a given set of predetermined conditions. By conditions it is meant periods of high pressure, end of a cylinder stroke, closing of a switch, etc.

*Operation*

The operation of the invention will be described in conjunction with the drawing of the main valve 10 and auxiliary valve 11. Fluid is normally delivered to the valve inlet at a predetermined operating rate. If the solenoid is de-energized, the fluid enters the main valve at inlet port 13, flows into chamber 18 and through axial passage 22 of piston 20. The fluid thus enters chamber 23 situated behind, i.e. to the left of, piston 20 and in turn passes to outlet port 14 and into port 14a and chamber 43 of auxiliary valve 11. From chamber 43 the fluid passes through valve 47 into port 15a and in turn to port 15b to continue its flow through the secondary circuit.

If the normal range of operating pressure is exceeded, the first valve assembly is utilized to maintain the pressure so that the pressure will fall within the operating range. The predetermined operating range is retained by setting adjusting screw 38 on the first valve assembly of main valve 10 to provide sufficient tension on spring 31 to cause poppet 30 to remain in sealing engagement with passage 29 at the left end thereof when the solenoid is de-energized. Thus, bore 46 remains open. When the solenoid is energized, blocking bore 46, that pressure which is exerted on poppet 30 through passage 29 will compress spring 31. As spring 31 is compressed, fluid is allowed to pass through passage 29 into venting port 16 and is returned to a sump.

If the flow in the line exceeds a predetermined maximum quantity even though a portion of the fluid is being vented as above described by the first valve assembly, the second valve assembly, i.e. piston 20 and spring 31, will move to the rear, i.e. to the left, opening up a passageway between chamber 18 and venting port 15, thus maintaining line pressure and source pressure.

The solenoid valve is generally responsive to a condition such as, for example, the travel of a piston, or the interruption of an operation, such as the control of hydraulic or electrical circuits or other predetermined conditions. With the solenoid actuated, the auxiliary valve is closed. When the solenoid closes the auxiliary valve, flow of fluid through outlet port 14 of the first valve assembly into port 14a of auxiliary valve 11 is terminated. Thus, all of the line pressure backing from port 15b and all of the source pressure coming into inlet port 13 will maintain primary circuit pressure in chamber 18. An excessive flow condition acting on the second valve assembly will move piston 20 rearwardly, i.e. to the left, and compresses spring 21. This will cause a throttling effect on primary circuit pressure. The relief valve is effective to discharge pressure to sump independent the particular position of the solenoid valve.

I claim:

A valve assembly comprising:

a body having a bore therethrough forming a first chamber and a second chamber;

an inlet port in fluid communication with said first chamber having an opening on a first external surface of said body;

an outlet port in fluid communication with said second chamber having an opening on said first external surface of said body;

said first external surface being disposed in a substantially flat plane;

a resiliently actuated normally closed piston valve having a passage therethrough interposed intermediate said first chamber and said second chamber;

a first venting port communicating with said bore intermediate said first chamber and said second chamber;

an auxiliary condition-responsive valve being responsive valve to an electrical input signal for operation thereof having a first passage in communication with said second chamber and a second passage in communication with said first venting port and having;

a plunger adapted to assume a first position to prevent the flow of fluid from said first passage to said second passage;

a second position to establish the flow of fluid from said first passage to said second passage, said condition responsive valve including a housing removably mounted on said body;

means to actuate said auxiliary valve; and a resiliently actuated normally closed relief valve having a body seat portion slidably mounted within said bore and having a ball plunger in concentric alignment with said piston valve, a spring interposed between said body seat portion and said piston valve to urge said piston valve toward a closed position, said relief valve being in communication with said second chamber, said relief valve having a discharge passage in communication with said first venting port, said relief valve characterized by being responsive to a pressure differential between said first passage of said condition responsive valve and said first venting port.

References Cited by the Examiner

UNITED STATES PATENTS

| | | | |
|---|---|---|---|
| 1,965,307 | 7/34 | Darling | 251—33 X |
| 2,102,865 | 12/37 | Vickers | 137—489 X |
| 2,664,916 | 1/54 | Conley | 251—30 X |
| 2,890,714 | 6/59 | Greenwood et al. | 137—491 X |
| 3,097,665 | 7/63 | Gauldie | 137—494 X |

M. CARY NELSON, *Primary Examiner.*

MARTIN P. SCHWARDRON, *Examiner.*